United States Patent
Tsumura et al.

(10) Patent No.: US 9,157,214 B2
(45) Date of Patent: Oct. 13, 2015

(54) BULLDOZER
(71) Applicant: KOMATSU LTD., Tokyo (JP)
(72) Inventors: Soichi Tsumura, Hirakata (JP); Kazuyuki Suzuki, Hirakata (JP)
(73) Assignee: KOMATSU LTD., Tokyo (JP)
( * ) Notice: Subject to any disclaimer, the term of this patent is extended or adjusted under 35 U.S.C. 154(b) by 3 days.

(21) Appl. No.: 14/232,646
(22) PCT Filed: Sep. 30, 2013
(86) PCT No.: PCT/JP2013/076593
§ 371 (c)(1),
(2) Date: Jan. 14, 2014
(87) PCT Pub. No.: WO2015/045171
PCT Pub. Date: Apr. 2, 2015

(65) Prior Publication Data
US 2015/0090467 A1   Apr. 2, 2015

(51) Int. Cl.
B60K 13/04 (2006.01)
E02F 9/08 (2006.01)
E02F 3/76 (2006.01)
F01N 13/00 (2010.01)

(52) U.S. Cl.
CPC .............. *E02F 9/0866* (2013.01); *B60K 13/04* (2013.01); *E02F 3/7609* (2013.01); *F01N 13/00* (2013.01)

(58) Field of Classification Search
USPC ........................ 180/296, 309; 172/776, 811
IPC ........................ E02F 9/00,9/0866; B60K 13/04
See application file for complete search history.

(56) References Cited

U.S. PATENT DOCUMENTS

| | | | |
|---|---|---|---|
| 8,191,668 B2 | 6/2012 | Keane et al. | |
| 8,505,661 B2 * | 8/2013 | Tsuji et al. | 180/68.4 |
| 8,720,638 B1 * | 5/2014 | Nakagami et al. | 180/309 |
| 8,770,325 B2 * | 7/2014 | Kinoshita et al. | 180/53.4 |
| 8,827,021 B1 * | 9/2014 | Nakagami et al. | 180/68.3 |
| 8,827,029 B1 * | 9/2014 | Nakagami et al. | 180/309 |
| 8,833,500 B2 * | 9/2014 | Nakamura et al. | 180/69.2 |
| 8,857,384 B2 * | 10/2014 | Yotsuzuka | 123/41.58 |
| 8,899,017 B2 * | 12/2014 | Himoto et al. | 60/282 |
| 2012/0138379 A1 | 6/2012 | Tsuji et al. | |
| 2012/0247861 A1 | 10/2012 | Mizuno et al. | |
| 2014/0124284 A1 * | 5/2014 | Sekiya et al. | 180/309 |
| 2014/0292033 A1 * | 10/2014 | Nakagami et al. | 296/190.08 |
| 2014/0305110 A1 * | 10/2014 | Himoto et al. | 60/324 |
| 2015/0000256 A1 * | 1/2015 | Kobayashi et al. | 60/282 |
| 2015/0027800 A1 * | 1/2015 | Himoto et al. | 180/296 |

FOREIGN PATENT DOCUMENTS

| | | | |
|---|---|---|---|
| DE | 10 2007 054 066 | * | 5/2008 |
| JP | H0419321 A | | 1/1992 |
| JP | 9-68034 A | | 3/1997 |
| JP | 2012-030736 A | | 2/2012 |
| JP | 2012-117397 A | | 6/2012 |
| JP | 2012-136845 A | | 7/2012 |
| JP | 2013-227729 | * | 11/2013 |
| WO | WO-2011152306 A1 | | 12/2011 |
| WO | 2014/174684 | * | 10/2014 |

* cited by examiner

*Primary Examiner* — Gary Hartmann
(74) *Attorney, Agent, or Firm* — Drinker Biddle & Reath LLP (57) ABSTRACT

Assemblies are arranged in such a manner that the diesel particulate filter device of one of the assemblies, the selective catalytic reduction device of the one assembly, the selective catalytic reduction device of the other assembly, and the diesel particulate filter device of the other assembly are located next to each other in this order as seen in a plan view. An exhaust pipe is located within a region made up of a region where the selective catalytic reduction device in the one assembly is arranged, a region where the selective catalytic reduction device in the other assembly is arranged, and a region between the selective catalytic reduction device in the one assembly and the selective catalytic reduction device in the other assembly, and located on an end side in the longitudinal direction, as seen in a plan view.

4 Claims, 5 Drawing Sheets

// BULLDOZER

TECHNICAL FIELD

The present invention relates to a bulldozer, and particularly relates to a bulldozer having a plurality of exhaust gas treatment units.

BACKGROUND ART

A bulldozer is mounted with an exhaust gas treatment device. As examples of the exhaust gas treatment device, there exist diesel particulate filter (DPF) device, diesel oxidation catalyst (DOC) device, selective catalytic reduction (SCR) device, and the like.

A work vehicle mounted with an exhaust gas treatment device is disclosed for example in U.S. Pat. No. 8,191,668 (see PTD 1).

A wheel loader configured as a work vehicle and shown in FIG. 9 of the above-referenced document has a plurality of exhaust gas treatment devices. The plurality of exhaust gas treatment devices are arranged so that the longitudinal direction of each exhaust gas treatment device is along the fore-and-aft direction of the vehicle.

CITATION LIST

Patent Document

PTD 1: U.S. Pat. No. 8,191,668

SUMMARY OF INVENTION

Technical Problem

In a bulldozer, an engine and an exhaust gas treatment device are arranged between a cab and a blade (dozing blade). Therefore, if the arrangement of the plurality of exhaust gas treatment devices in the above-referenced document is applied to the bulldozer, an engine compartment between the cab and the blade has a longer size in the fore-and-aft direction of the vehicle. As a result, the blade is located further frontward of the vehicle, away from the center of gravity of the bulldozer, and thus fluctuation of the blade in the top-and-bottom direction increases. Accordingly, it becomes difficult to bulldoze the ground flat and the dozing ability is thus deteriorated. In addition, the digging force is reduced.

Moreover, the fact that the engine compartment between the cab and the blade has a longer size in the fore-and-aft direction of the vehicle also deteriorates the front visibility from an operator.

The present invention has been made in view of the above-described problems, and an object of the invention is to provide a bulldozer configured to include a plurality of exhaust gas treatment units, having excellent dozing ability as well as large digging force, and providing excellent front visibility from an operator.

Solution to Problem

A bulldozer of the present invention includes a cab, a work implement, an engine, a first exhaust gas treatment unit, a second exhaust gas treatment unit, and an exhaust pipe. The work implement is located frontward of the cab. The engine is arranged between the cab and the work implement. The first exhaust gas treatment unit includes a first exhaust gas treatment device and a second exhaust gas treatment device. The second exhaust gas treatment unit includes a third exhaust gas treatment device and a fourth exhaust gas treatment device. The exhaust pipe is connected to each of the second exhaust gas treatment device and the fourth exhaust gas treatment device. The first to fourth exhaust gas treatment devices are arranged next to each other, between the cab and the work implement, in an order of the first exhaust gas treatment device, the second exhaust gas treatment device, the fourth exhaust gas treatment device, and the third exhaust gas treatment device, so that a longitudinal direction of each exhaust gas treatment device is along a vehicular width direction, as seen in a plan view. The exhaust pipe is located within a region made up of a region where the second exhaust gas treatment device is arranged, a region where the fourth exhaust gas treatment device is arranged, and a region between the second exhaust gas treatment device and the fourth exhaust gas treatment device, and located on an end side in the longitudinal direction, as seen in a plan view.

In the bulldozer of the present invention, the first to fourth exhaust gas treatment devices are arranged between the cab and the work implement so that the longitudinal direction of each device is along the vehicular width direction, as seen in a plan view. Therefore, the length, in the fore-and-aft direction of the vehicular body, of the exhaust gas treatment structure including the first to fourth exhaust gas treatment devices can be made shorter than that of the arrangement disclosed in the above-referenced document. Accordingly, the work implement can be arranged closer to the cab, which makes the dozing ability excellent and keeps the digging force large.

Since the length, in the fore-and-aft direction of the vehicular body, of the exhaust gas treatment structure including the first to fourth exhaust gas treatment devices can be made shorter, the front visibility from an operator is also excellent. In addition, the exhaust pipe is located on an end side in the longitudinal direction of the second and fourth exhaust gas treatment devices, which facilitates arrangement of the exhaust pipe away in the vehicular width direction from the line of sight in front of an operator. In this respect too, the front visibility from an operator is also excellent.

In the bulldozer, the first exhaust gas treatment unit includes a first intermediate connection pipe connecting the first exhaust gas treatment device and the second exhaust gas treatment device, and the second exhaust gas treatment unit includes a second intermediate connection pipe connecting the third exhaust gas treatment device and the fourth exhaust gas treatment device. The second exhaust gas treatment device includes a first body portion and a first exhaust pipe connecting part extended from the first body portion and connected to the exhaust pipe, and the fourth exhaust gas treatment device includes a second body portion and a second exhaust pipe connecting part extended from the second body portion and connected to the exhaust pipe. Each of a region where the first exhaust pipe connecting part is arranged and a region where the second exhaust pipe connecting part is arranged is located separately from each of a region where the first intermediate connection pipe is arranged and a region where the second intermediate connection pipe is arranged, with a gap interposed between the regions, as seen in a plan view.

Accordingly, the first or second exhaust pipe connecting part can be prevented from overlying, in the height direction, the first or second intermediate connection pipe, and the height of them can be kept low. Therefore, the front visibility from an operator can be kept excellent.

In the bulldozer, the first exhaust pipe connecting part extends obliquely upward from the first body portion and the second exhaust pipe connecting part extends obliquely upward from the second body portion, so that a leading end of the first exhaust pipe connecting part and a leading end of the second exhaust pipe connecting part approach each other.

Accordingly, to the leading end of the first exhaust pipe connecting part and the leading end of the second exhaust pipe connecting part which are located close to each other, a single common exhaust pipe can easily be connected. Therefore, a configuration can easily be obtained that is simpler than a configuration where exhaust pipes are individually connected respectively to the leading end of the first exhaust pipe connecting part and the leading end of the second exhaust pipe connecting part, respectively.

In the bulldozer, the first exhaust pipe connecting part and the second exhaust pipe connecting part are arranged next to each other on the same end side in the longitudinal direction of the second exhaust gas treatment device and the longitudinal direction of the fourth exhaust gas treatment device.

Accordingly, it is facilitated to connect a single common exhaust pipe to the leading end of the first exhaust pipe connecting part and the leading end of the second exhaust pipe connecting part that are arranged next to each other on the same end side. Therefore, a configuration can easily be obtained that is simpler than a configuration where exhaust pipes are individually connected to the leading end of the first exhaust pipe connecting part and the leading end of the second exhaust pipe connecting part, respectively.

Advantageous Effects of Invention

As heretofore described, the present invention can implement a bulldozer configured to include a plurality of exhaust gas treatment devices and still having excellent dozing ability and excellent front visibility from an operator.

BRIEF DESCRIPTION OF DRAWINGS

FIG. 5 is a plan view schematically showing a relationship between arrangement of exhaust gas treatment devices and the dimensions, and illustrating a configuration (A) of a first comparative example where exhaust gas treatment devices are arranged in two rows and two columns, a configuration (B) of a second comparative example where four exhaust gas treatment devices are arranged next to each other along the vehicular width direction so that the longitudinal direction of each exhaust gas treatment device is the fore-and-aft direction of the vehicular body, and a configuration (C) of the present embodiment where four exhaust gas treatment devices are arranged next to each other along the fore-and-aft direction of the vehicular body so that the longitudinal direction of each exhaust gas treatment device is the vehicular width direction.

DESCRIPTION OF EMBODIMENTS

An embodiment of the present invention will be described hereinafter based on the drawings.

In the following description regarding the drawings, the fore-and-aft direction means the fore-and-aft direction of a bulldozer 30. In other words, the fore-and-aft direction means the fore-and-aft direction with respect to an operator sitting on an operator's seat in a cab 38. The right-and-left direction or the lateral direction means the vehicular width direction of bulldozer 30. In other words, the right-and-left direction, the vehicular width direction, or the lateral direction is the right-and-left direction with respect to the aforementioned operator. In addition, in the drawings referenced below, the fore-and-aft direction is indicated by an arrow X, the right-and-left direction is indicated by an arrow Y, and the top-and-bottom direction is indicated by an arrow Z.

Figure 1:
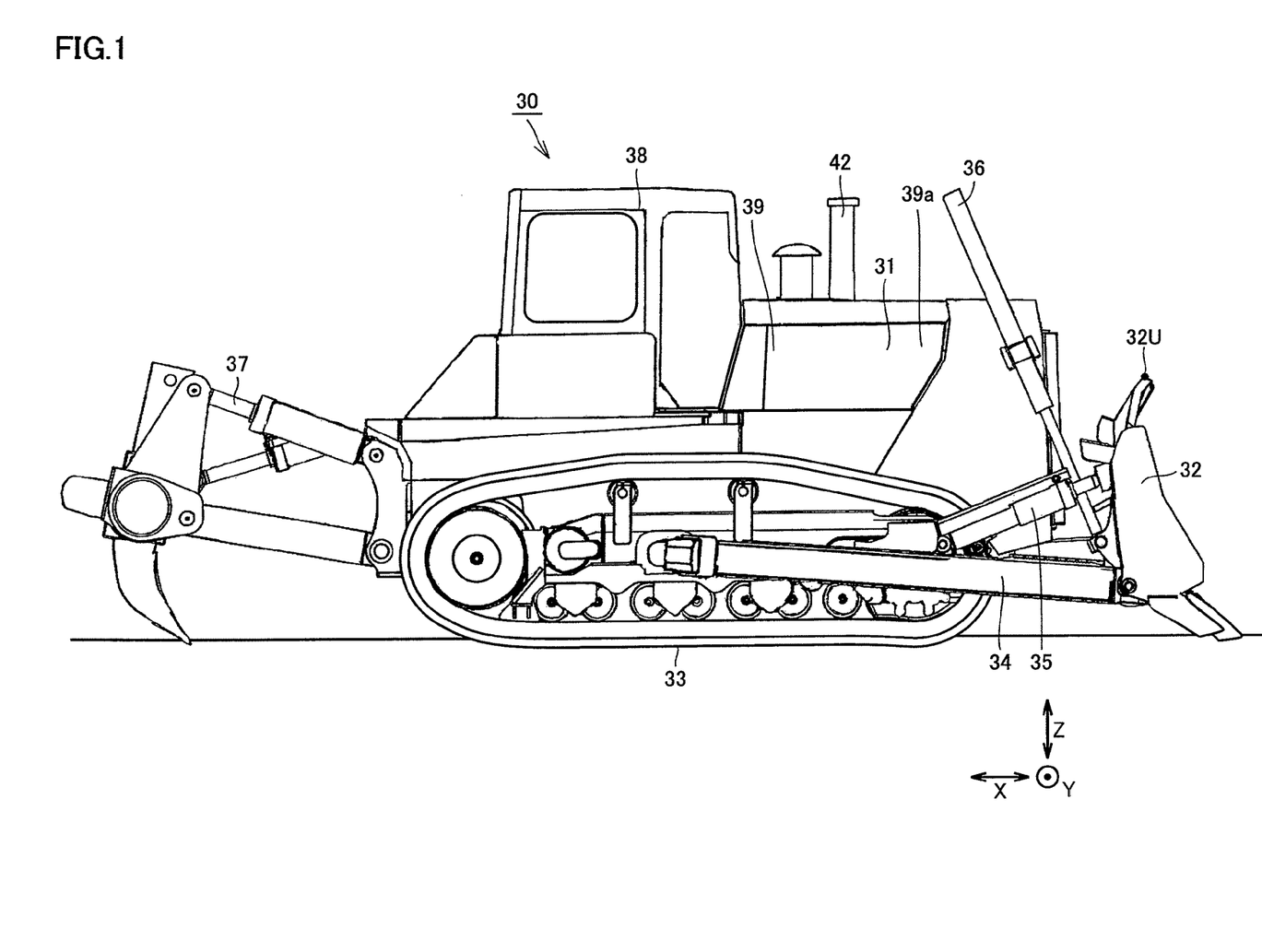
FIG. 1 is a side view schematically showing a configuration of a bulldozer in one embodiment of the present invention.

FIG. 1 is a side view schematically showing a configuration of a bulldozer in one embodiment of the present invention. Referring to FIG. 1, bulldozer 30 of the present embodiment chiefly includes a traveling device having a pair of right and left crawler-type carriers 33 separated in the vehicular width direction (Y direction) from each other, a vehicular body 31 arranged between the pair of right and left crawler-type carriers 33, a blade 32 (work implement) positioned frontward of vehicular body 31, and a ripper device 37 positioned rearward of vehicular body 31.

Vehicular body 31 includes cab (operator's cab) 38 and an engine compartment 39. Cab 38 occupies an upper rear portion of vehicular body 31, and engine compartment 39 is arranged frontward of cab 38 and between cab 38 and blade 32. This cab 38 is configured to have an operator's seat which is located inside for an operator to sit, and enclose the operator's seat. The dimension in the vehicular width direction (Y direction) of engine compartment 39 is made substantially identical to the dimension in the vehicular width direction (Y direction) of cab 38. Engine compartment 39 has its outside covered with an engine hood 39a. An exhaust pipe 42 protrudes upward from inside engine compartment 39 through engine hood 39a.

Blade 32 has its right and left sides both supported by a frame 34, and adapted to be operated by tilt cylinders 35 and lift cylinders 36. Frame 34 is a member in the shape of a quadrangular prism and has its one ends attached to the rear surface of blade 32 by supports of universal joints, and its other ends supported on the side surfaces of the traveling device. Braces (not shown) have their one ends attached, by supports of universal joints, to a substantially central portion in the vehicular width direction (Y direction) of the rear surface of blade 32, and their other ends attached, by a rotatable support, to the side surfaces, on the vehicular body 31 sides of frame 34.

Tilt cylinder 35 has its one end supported on the rear surface of blade 32 and its other end supported on the upper surface of frame 34. This tilt cylinder 35 can be hydraulically extended and contracted to thereby cause an upper end 32U of blade 32 to move in the top-and-bottom direction (Z direction) about a support, given by the brace, to blade 32, and roll the posture of blade 32 about a rotational axis in the fore-and-aft direction (X direction).

Lift cylinder 36 has its one end supported on the rear surface of blade 32 and its central portion supported on the side surface of vehicular body 31. This lift cylinder 36 can be hydraulically extended and contracted to thereby cause blade 32 to move in the top-and-bottom direction about the other end (lateral end of the traveling device) of frame 34.

Next, a description will be given, using FIGS. 2 to 4, of a configuration of an engine unit (including engine, exhaust gas treatment structure, and the like) mounted on the above-described bulldozer.

Figure 2:
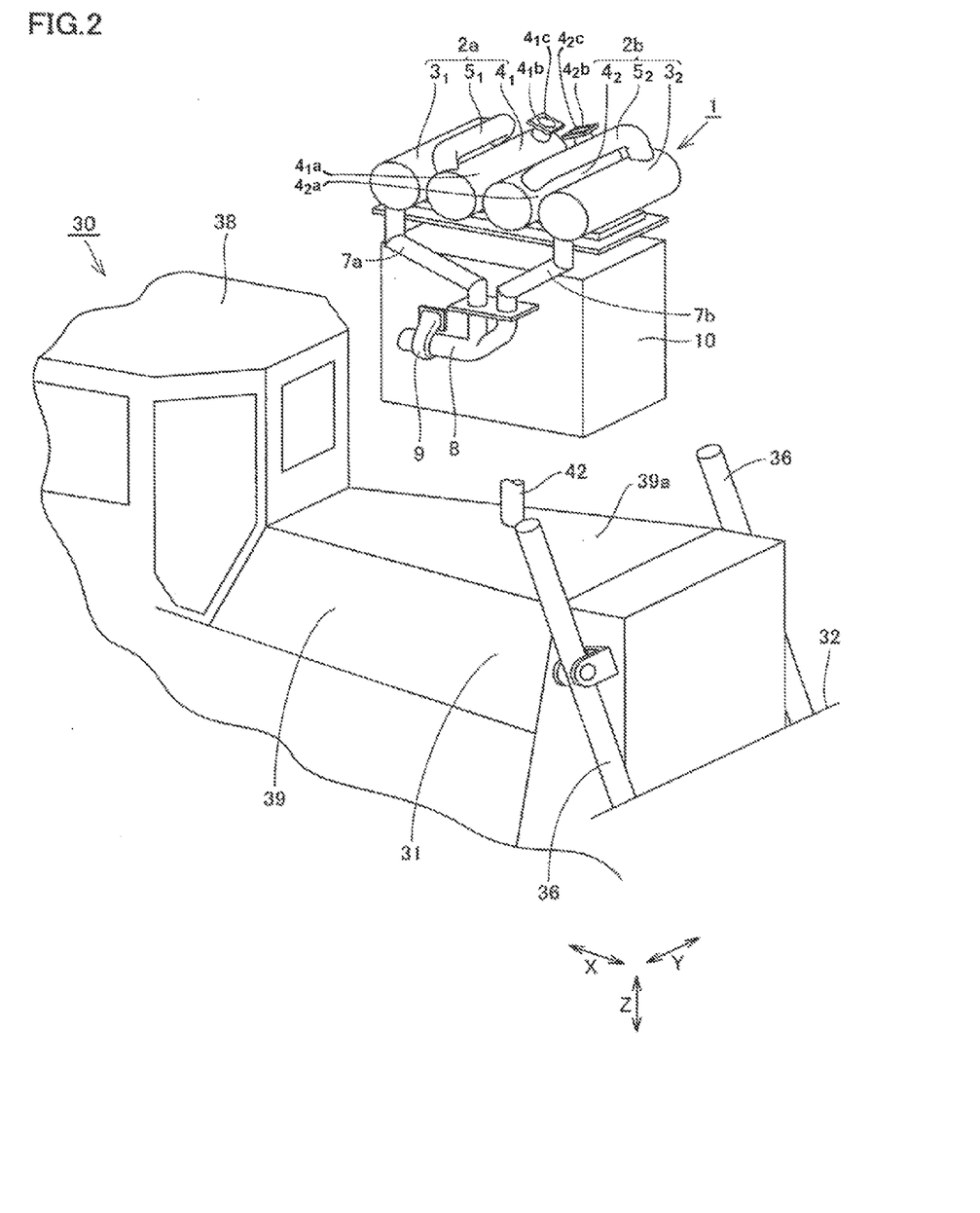
FIG. 2 is a partial perspective view showing separately a vehicular body of the bulldozer shown in FIG. 1 and an engine unit (including engine, exhaust gas treatment structure, and the like).

FIG. 2 is a partial perspective view showing separately the vehicular body of the bulldozer shown in FIG. 1 and the engine unit. In engine compartment 39 covered with engine hood 39a, the engine unit is arranged. For the sake of description here, FIG. 2 shows the engine unit at the position displaced upward in the top-and-bottom direction (Z direction) from the position where it is actually arranged, so that the engine unit is shown above engine hood 39a. This engine unit chiefly includes an engine 10, an exhaust gas treatment structure 1, first and second connection pipes 7a, 7b, a branch pipe 8, and a supercharger 9.

Engine 10 is a large diesel engine having a displacement for example of 15 liters or more. This engine 10 is arranged within engine compartment 39 and accordingly arranged between cab 38 and blade 32.

Exhaust gas treatment structure 1 is arranged between cab 38 and blade 32 and above engine 10. This exhaust gas treatment structure 1 includes two sets of assemblies (first and second exhaust gas treatment units) 2a, 2b. Assembly 2a (first exhaust gas treatment unit) includes a first exhaust gas treatment device $3_1$, a second exhaust gas treatment device $4_1$, and a first intermediate connection pipe $5_1$. Assembly 2b (second exhaust gas treatment unit) includes a third exhaust gas treatment device $3_2$, a fourth exhaust gas treatment device $4_2$, and a second intermediate connection pipe $5_2$.

As the combination of first and second exhaust gas treatment devices $3_1$, $4_1$, an appropriate combination may be selected from a diesel particulate filter device, a diesel oxidation catalyst device, and a selective catalytic reduction device. As the combination of third and fourth exhaust gas treatment devices $3_2$, $4_2$ as well, an appropriate combination may be selected from a diesel particulate filter device, a diesel oxidation catalyst device, and a selective catalytic reduction device.

In the present embodiment, first and third exhaust gas treatment devices $3_1$, $3_2$ are each a diesel particulate filter device, for example, and second and fourth exhaust gas treatment devices $4_1$, $4_2$ are each a selective catalytic reduction device, for example. First and second intermediate connection pipes $5_1$, $5_2$ are each a mixing pipe, for example.

Diesel particulate filter device is a device which treats exhaust gas from engine 10, and chiefly includes a filter (not shown) and a heater (not shown) provided in association with this filter. Diesel particulate filter device is configured to collect, by means of the filter, particulate matter (PM) contained in the exhaust gas of engine 10, and burn the collected particulate matter. The filter is made for example of a ceramic material.

Selective catalytic reduction device is a device which treats exhaust gas from engine 10, for exclusively reducing a nitrogen oxide $NO_x$ through a catalytic reaction using, as a reducing agent, ammonia for example which is generated through hydrolysis of an aqueous urea solution. In terms of the principle, the fact that ammonia ($NH_3$) chemically reacts with a nitrogen oxide ($NO_x$) and is accordingly reduced to nitrogen ($N_2$) and water ($H_2O$) is applied to selective catalytic reduction device. It should be noted that it is dangerous to load bulldozer 30 with ammonia, and therefore bulldozer 30 is mounted with an aqueous urea solution tank in which an aqueous urea solution is placed for example, as a reducing agent tank. It should be noted that the reducing agent is not limited to the aqueous urea solution and may be any as long as it can reduce a nitrogen oxide $NO_x$.

Selective catalytic reduction device, shown as second and fourth exhaust gas treatment devices $4_1$, $4_2$, includes a body portion $4_1a$, $4_2a$ for causing the above-described reduction, and an exhaust pipe connecting part $4_1b$, $4_2b$ for discharging the exhaust gas reduced in body portion $4_1a$, $4_2a$. This exhaust pipe connecting part $4_1b$, $4_2b$ is provided with a gas outlet $4_1c$, $4_2c$ for discharging the exhaust gas. Exhaust pipe connecting part $4_1b$, $4_2b$ extends obliquely upward from body portion $4_1a$, $4_2a$.

Intermediate connection pipe (mixing pipe) $5_1$, $5_2$ connects diesel particulate filter device (first and third exhaust gas treatment devices $3_1$, $3_2$) and selective catalytic reduction device (second and fourth exhaust gas treatment devices $4_1$, $4_2$) to each other. Namely, by means of mixing pipe (first and second intermediate connection pipes $5_1$, $5_2$), diesel particulate filter device (first and third exhaust gas treatment devices $3_1$, $3_2$) and selective catalytic reduction device (second and fourth exhaust gas treatment devices $4_1$, $4_2$) are connected to each other. This mixing pipe injects for example an aqueous urea solution into the exhaust gas directed from diesel particulate filter device toward selective catalytic reduction device for mixing the exhaust gas with water and urea.

Exhaust gas treatment structure 1 and engine 10 are connected to each other by first and second connection pipes 7a, 7b. Namely, first connection pipe 7a directs exhaust gas from engine 10 to diesel particulate filter device (first exhaust gas treatment device $3_1$) of assembly 2a. Second connection pipe 7b also directs exhaust gas from engine 10 to diesel particulate filter device (third exhaust gas treatment device $3_2$) of assembly 2b. First connection pipe 7a and second connection pipe 7b each have an engine 10-side end connected to an exhaust port of engine 10 through branch pipe 8 and supercharger 9.

First and second connection pipes 7a, 7b are each a pipe joint, which may be a bellows expansion pipe joint having an expandable bellows portion. For the sake of thermal resistance and corrosion resistance, first and second connection pipes 7a, 7b are each made of a steel material such as stainless steel for example.

Figure 3:
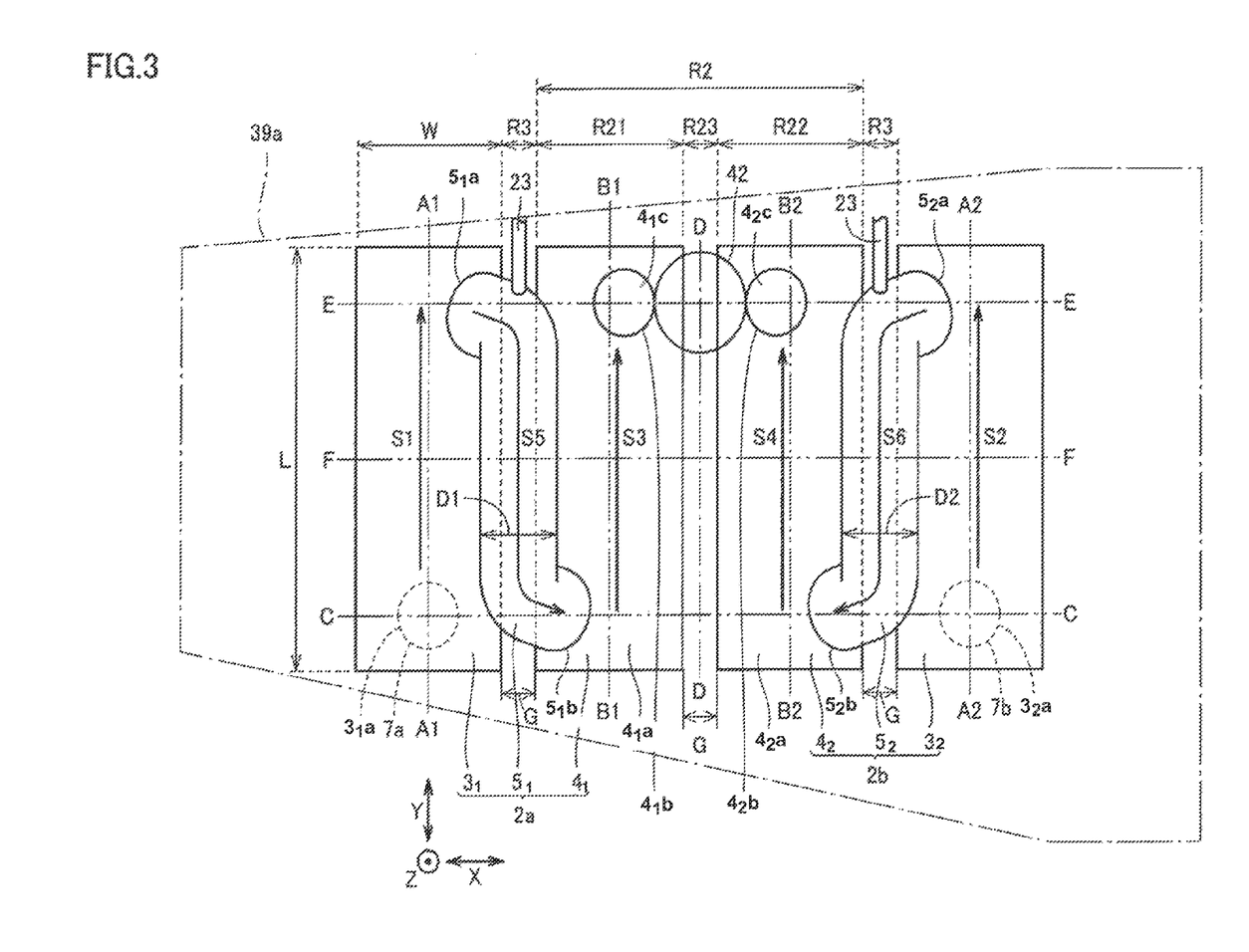
FIG. 3 is a plan view schematically showing, from above, a configuration of the exhaust gas treatment structure shown in FIG. 2.

FIG. 3 is a plan view schematically showing, from above, a configuration of the exhaust gas treatment structure shown in FIG. 2. Referring to FIG. 3, diesel particulate filter device (first and third exhaust gas treatment devices $3_1$, $3_2$) of assemblies 2a, 2b each has a substantially cylindrical contour. Body portion $4_1a$, $4_2a$ of selective catalytic reduction device (second and fourth exhaust gas treatment devices $4_1$, $4_2$) of assemblies 2a, 2b each also has a substantially cylindrical contour.

Constituent devices, such as two diesel particulate filter devices (first and third exhaust gas treatment devices $3_1$, $3_2$) and two selective catalytic reduction devices (second and fourth exhaust gas treatment devices $4_1$, $4_2$), extend longer in the direction of central axes A1, A2, B1, B2 of the cylindrical shapes than in the radial direction. Namely, constituent devices each have a dimension L in the direction of central axes A1, A2, B1, B2 that is longer than a radial dimension W. Thus, the longitudinal direction of each of constituent devices corresponds to the direction of the aforementioned central axes A1, A2, B1, B2 each.

Constituent devices are arranged so that respective longitudinal directions extend (run) next to each other as seen in a plan view. Namely, constituent devices are arranged so that respective central axes A1, A2, B1, B2 extend (run) next to each other. As long as respective central axes A1, A2, B1, B2 of constituent devices extend (run) next to each other, they may or may not be in parallel with each other.

The two sets of assemblies 2a, 2b are arranged so that diesel particulate filter device (first exhaust gas treatment device $3_1$) of assembly 2a, selective catalytic reduction device (second exhaust gas treatment device $4_1$) of assembly 2a, selective catalytic reduction device (fourth exhaust gas treatment device $4_2$) of assembly 2b, and diesel particulate filter device (third exhaust gas treatment device $3_2$) of assembly 2b are located next to each other in this order as seen in a plan view.

Two diesel particulate filter devices (devices $3_1$ and $3_2$) have respective one ends in their longitudinal direction A1, A2 that are provided with respective gas inlets $3_1a$, $3_2a$ to which first and second connection pipes 7a, 7b are connected, respectively. Two diesel particulate filter devices (devices $3_1$ and $3_2$) have respective other ends in their longitudinal direction A1, A2 that are provided with gas outlets $5_1a$, $5_2a$ to which mixing pipes (first and second intermediate connection pipes $5_1$, $5_2$) are connected, respectively. Thus, two diesel particulate filter devices (devices $3_1$ and $3_2$) are each configured so that exhaust gas moves through paths, as indicated by arrows S1, S2, in longitudinal direction A1, A2 of diesel particulate filter devices (devices $3_1$ and $3_2$).

Two selective catalytic reduction devices (devices $4_1$, $4_2$) have respective one ends in their longitudinal direction that are provided with respective gas inlets $5_1b$, $5_2b$ to which mixing pipes (first and second intermediate connection pipes $5_1$, $5_2$) are connected, respectively. Two selective catalytic reduction devices (devices $4_1$, $4_2$) have respective other ends in their longitudinal direction B1, B2 that are provided with exhaust pipe connecting parts $4_1b$, $4_2b$, and exhaust pipe connecting parts $4_1b$, $4_2b$ are provided with gas outlets $4_1c$, $4_2c$. Thus, two selective catalytic reduction devices (devices $4_1$, $4_2$) are each configured so that exhaust gas moves therein through paths, as indicated by arrows S3, S4, in longitudinal direction B1, B2 of selective catalytic reduction devices (devices $4_1$, $4_2$). The direction in which exhaust gas moves in selective catalytic reduction device is the same as the direction in which exhaust gas moves in diesel particulate filter device (devices $3_1$ and $3_2$).

Two mixing pipes (first and second intermediate connection pipes $5_1$, $5_2$) each have a portion extending along the vehicular width direction (Y direction). Two mixing pipes (first and second intermediate connection pipes $5_1$, $5_2$) are each configured so that exhaust gas moves therein through paths, as indicated by arrows S5, S6, in the longitudinal direction of mixing pipes (first and second intermediate connection pipes $5_1$, $5_2$). The direction in which exhaust gas moves in mixing pipe (first and second intermediate connection pipes $5_1$, $5_2$) is opposite to the direction in which exhaust gas moves in each of diesel particulate filter device (devices $3_1$ and $3_2$) and selective catalytic reduction device (devices $4_1$, $4_2$).

Two diesel particulate filter devices (devices $3_1$ and $3_2$) and two selective catalytic reduction devices (devices $4_1$, $4_2$) are located next to each other along the direction which crosses (for example, which is orthogonal to) longitudinal direction A1, A2, B1, B2. More specifically, longitudinal direction A1, A2, B1, B2 respectively of two diesel particulate filter devices (devices $3_1$ and $3_2$) and two selective catalytic reduction devices (devices $4_1$, $4_2$) extend along the vehicular width direction (Y direction) of bulldozer 30, while two diesel particulate filter devices (devices $3_1$ and $3_2$) and two selective catalytic reduction devices (devices $4_1$, $4_2$) are located next to each other along the fore-and-aft direction (X direction) of bulldozer 30.

Regarding the exhaust path in exhaust gas treatment structure 1, exhaust gas moves from one end to the other end in longitudinal direction A1 of diesel particulate filter device (devices $3_1$ and $3_2$). Then, the exhaust gas turns to proceed in the opposite direction through mixing pipe (first and second intermediate connection pipes $5_1$, $5_2$) and thereby reaches one end in longitudinal direction B1 of selective catalytic reduction device (devices $4_1$, $4_2$). After this, the exhaust gas turns again in the opposite direction in selective catalytic reduction device (devices $4_1$, $4_2$) to move from one end to the other end in longitudinal direction B1 of selective catalytic reduction device (devices $4_1$, $4_2$), and is discharged from gas outlet $4_1c$, $4_2c$ of exhaust pipe connecting part $4_1b$, $4_2b$. Thus, the exhaust path is in the S shape as seen in a plan view, for example.

Respective gas inlets $3_1a$, $3_2a$ of two diesel particulate filter devices (devices $3_1$ and $3_2$) are arranged on the same side (lower side as seen in the drawing) in longitudinal direction A1, A2. In the case where respective longitudinal directions A1, A2 of two diesel particulate filter devices (devices $3_1$ and $3_2$) are parallel to each other as seen in a plan view, respective gas inlets $3_1a$, $3_2a$ of two diesel particulate filter devices (devices $3_1$ and $3_2$) are located on a virtual line C extending in the direction orthogonal to both longitudinal directions A1, A2. In addition, respective gas inlets $5_1b$, $5_2b$ of two selective catalytic reduction devices (devices $4_1$, $4_2$) may also be located on this virtual line C.

In the case where respective longitudinal directions B1, B2 of two selective catalytic reduction devices (devices $4_1$, $4_2$) are parallel to each other as seen in a plan view, respective gas outlets $4_1c$, $4_2c$ of two exhaust pipe connecting parts $4_1b$, $4_2b$ are located on a virtual line E extending in the direction orthogonal to both longitudinal directions B1, B2. In addition, respective gas outlets $5_1a$, $5_2a$ of two diesel particulate filter devices (devices $3_1$ and $3_2$) may also be located on this virtual line E.

Two exhaust pipe connecting parts $4_1b$, $4_2b$ and their respective gas outlets $4_1c$, $4_2c$ are arranged on the same side (upper side as seen in the drawing) in longitudinal direction B1, B2. Namely, two exhaust pipe connecting parts $4_1b$, $4_2b$ and their respective gas outlet $4_1c$, $4_2c$ are arranged on the same side (upper side as seen in the drawing) with respect to a virtual line F which extends through respective centers, in the longitudinal direction, of diesel particulate filter devices (devices $3_1$ and $3_2$) and selective catalytic reduction devices (devices $4_1$, $4_2$).

As seen in a plan view, diesel particulate filter device (device $3_1$) and selective catalytic reduction device (device $4_1$) of assembly 2a are arranged line-symmetrically to diesel particulate filter device (device $3_2$) and selective catalytic reduction device (device $4_2$) of assembly 2b with respect to a virtual line D extending in the longitudinal direction between two selective catalytic reduction devices (devices $4_1$, $4_2$).

A distance G between diesel particulate filter device (device $3_1$) and selective catalytic reduction device (device $4_1$) in assembly 2a is smaller than a diameter D1 of mixing pipe (first intermediate connection pipe $5_1$). A distance G between diesel particulate filter device (device $3_2$) and selective catalytic reduction device (device $4_2$) in assembly 2b is smaller than a diameter D2 of mixing pipe (second intermediate connection pipe $5_2$). Therefore, as seen in a plan view, a space R3 having distance G between diesel particulate filter device (devices $3_1$ and $3_2$) and selective catalytic reduction device (devices $4_1$, $4_2$) in each of assemblies 2a, 2b overlaps mixing pipe (first and second intermediate connection pipes $5_1$, $5_2$) of assemblies 2a, 2b each. In addition, distance G between selective catalytic reduction device (device $4_1$) in assembly 2a and selective catalytic reduction device (device $4_2$) in assembly 2b is smaller than each of diameters D1, D2 of two mixing pipes (first and second intermediate connection pipes $5_1$, $5_2$).

Exhaust pipe 42 is located, as seen in a plan view, in a region R2 which is made up of a region R21 where selective catalytic reduction device (device $4_1$) in assembly 2a is arranged, a region R22 where selective catalytic reduction device (device $4_2$) in assembly 2b is arranged, and a region R23 between selective catalytic reduction device (device $4_1$) in assembly 2a and selective catalytic reduction device (device $4_2$) in assembly 2b.

Exhaust pipe 42 is located on an end side in the longitudinal direction (Y direction) of selective catalytic reduction device. Namely, exhaust pipe 42 is placed at a position which is offset toward an end in the longitudinal direction, relative to virtual line F extending through respective centers of the longitudinal axes of two selective catalytic reduction devices (devices $4_1$, $4_2$). This exhaust pipe 42 is arranged, as seen in a plan view, between exhaust pipe connecting part $4_1b$ of selective catalytic reduction device (device $4_1$) in assembly 2a and exhaust pipe connecting part $4_2b$ of selective catalytic reduction device (device $4_2$) in assembly 2b, for example.

Exhaust pipe 42 is arranged, as seen in a plan view, in a region located separately from each of the regions where two mixing pipes (first and second intermediate connection pipes $5_1$, $5_2$) are arranged, respectively. Namely, exhaust pipe 42 is arranged at a position which overlaps none of two mixing pipes (first and second intermediate connection pipes $5_1$, $5_2$) as seen in a plan view. Accordingly, exhaust pipe connecting part $4_1b$, $4_2b$ connected to exhaust pipe 42 can be arranged in a region located separately from the regions where two mixing pipes (first and second intermediate connection pipes $5_1$, $5_2$) are arranged respectively, as seen in a plan view, and can be arranged so that exhaust pipe connecting part $4_1b$, $4_2b$ overlaps none of two mixing pipes (first and second intermediate connection pipes $5_1$, $5_2$) as seen in a plan view.

Figure 4:
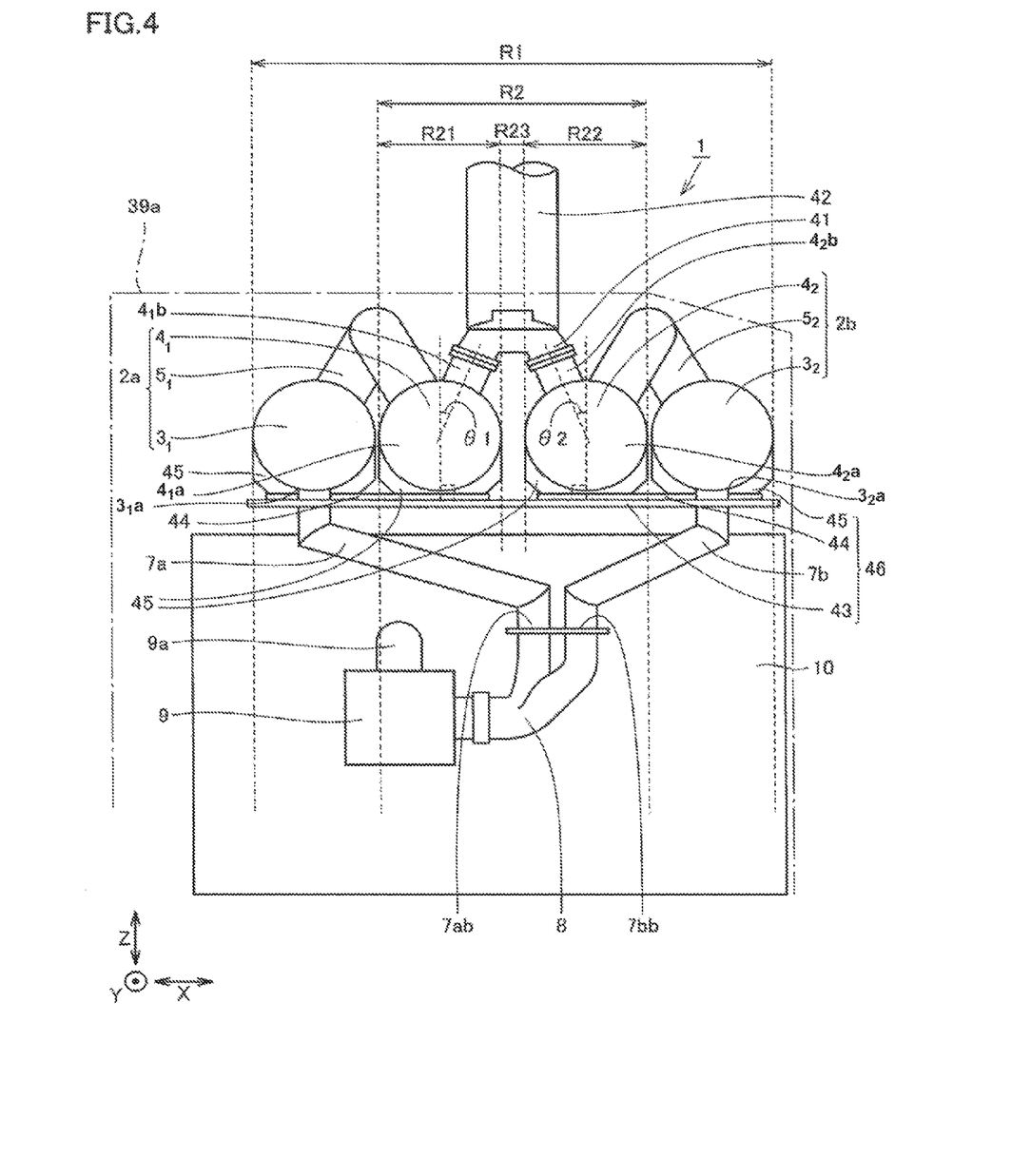
FIG. 4 is a right side view schematically showing, from the right side, a configuration of the engine unit shown in FIG. 2.

FIG. 4 is a right side view schematically showing, from the right side, a configuration of the engine unit shown in FIG. 2. Referring to FIG. 4, first connection pipe 7a has one end 7ab connected to exhaust port 9a of engine 10 through branch pipe 8 and supercharger 9. First connection pipe 7a also has the other end connected to gas inlet $3_1a$ of diesel particulate filter device (device $3_1$) in assembly 2a.

The other end of first connection pipe 7a may be connected directly to gas inlet $3_1a$ of diesel particulate filter device (device $3_1$) in assembly 2a without another pipe interposed therebetween, or connected indirectly thereto with another pipe interposed therebetween. In addition, one end 7ab of first connection pipe 7a may be connected to exhaust port 9a of engine 10 without supercharger 9 interposed therebetween.

First connection pipe 7a includes: a first vertically extending portion extending in Z direction from one end 7ab; a first tilt portion extending from this first vertically extending portion at a predetermined tilt angle with respect to X direction; and a second vertically extending portion extending in Z direction from the first tilt portion to be connected to diesel particulate filter device (devices $3_1$ and $3_2$). The tilt portion may be provided with a bellows portion.

Second connection pipe 7b has one end 7bb connected to exhaust port 9a of engine 10 through branch pipe 8 and supercharger 9. Second connection pipe 7b also has the other end connected to gas inlet $3_2a$ of diesel particulate filter device (device $3_2$) in assembly 2b.

The other end of second connection pipe 7b may be connected directly to gas inlet $3_2a$ of diesel particulate filter device (device $3_2$) in assembly 2b without another pipe interposed therebetween, or connected indirectly thereto with another pipe interposed therebetween. In addition, one end 7bb of second connection pipe 7b may be connected to exhaust port 9a of engine 10 without supercharger 9 interposed therebetween.

Second connection pipe 7b includes: a third vertically extending portion extending in Z direction from one end 7bb; a second tilt portion extending from this third vertically extending portion at a predetermined tilt angle with respect to X direction; and a fourth vertically extending portion extending in Z direction from the second tilt portion to be connected to diesel particulate filter device (devices $3_1$ and $3_2$). The second crosswise extending portion may be provided with a bellows portion.

The first crosswise extending portion of first connection pipe 7a and the second crosswise extending portion of second connection pipe 7b extend oppositely from each other, from the direction of respective one ends 7aa, 7bb toward respective other ends. Namely, while the first crosswise extending portion of first connection pipe 7a extends leftward as seen in the drawing, from the direction of one end 1ab toward the other end, the crosswise extending portion of second connection pipe 7b extends rightward as seen in the drawing, from the direction of one end 7bb toward the other end.

Exhaust pipe connecting part $4_1b$, $4_2b$ of each of assembly 2a and assembly 2b extends obliquely upward from body portion $4_1a$, $4_2a$. Here, the obliquely upward extension means upward extension at a tilt angle θ1, θ2 with respect to the direction perpendicular to a surface (upper surface) of a flat-plate-shaped sub bracket 44 which is included in a support member 46 supporting exhaust gas treatment structure 1, for example. Respective exhaust pipe connecting parts $4_1b$, $4_2b$ of assembly 2a and assembly 2b extend obliquely upward so that respective leading ends (upper ends) of these exhaust pipe connecting parts $4_1b$, $4_2b$ approach each other.

To respective leading ends of exhaust pipe connecting parts $4_1b$, $4_2b$ of assembly 2a and assembly 2b, a collecting pipe 41 is connected. This collecting pipe 41 is capable of allowing the exhaust gas from exhaust pipe connecting part $4_1b$ of assembly 2a and the exhaust gas from exhaust pipe connecting part $4_2b$ of assembly 2b to merge with each other. Collecting pipe 41 is connected to exhaust pipe 42. Thus, respective exhaust pipe connecting parts $4_1b$, $4_2b$ of assembly 2a and assembly 2b are connected through collecting pipe 41 to exhaust pipe 42. Accordingly, the exhaust gas from exhaust pipe connecting part $4_1b$ of assembly 2a and the exhaust gas from exhaust pipe connecting part $4_2b$ of assembly 2b can be merged with each other in collecting pipe 41 and thereafter discharged into the atmosphere from exhaust pipe 42.

Next, a description will be given, using FIGS. 3 and 5, of the dimensions and the like of diesel particulate filter device (devices $3_1$ and $3_2$) and selective catalytic reduction device (devices $4_1$, $4_2$).

Referring to FIG. 3, it is supposed that first to fourth exhaust gas treatment devices $3_1$, $4_2$ (diesel particulate filter devices (devices $3_1$ and $3_2$) and selective catalytic reduction devices (devices $4_1$, $4_2$)) have respective substantially cylindrical shapes which are substantially identical to each other, the length of the substantially cylindrical shape is L, the diameter thereof is W, and the dimension of the gap between the exhaust gas treatment devices as seen in a plan view is G. Then, it is preferable that each exhaust gas treatment device $3_1$, $3_2$, $4_1$, $4_2$ satisfies L<4W+3G<2L+G, and also satisfies 2W<L<4W. This will be described hereinafter by means of FIG. 5.

Figure 5:
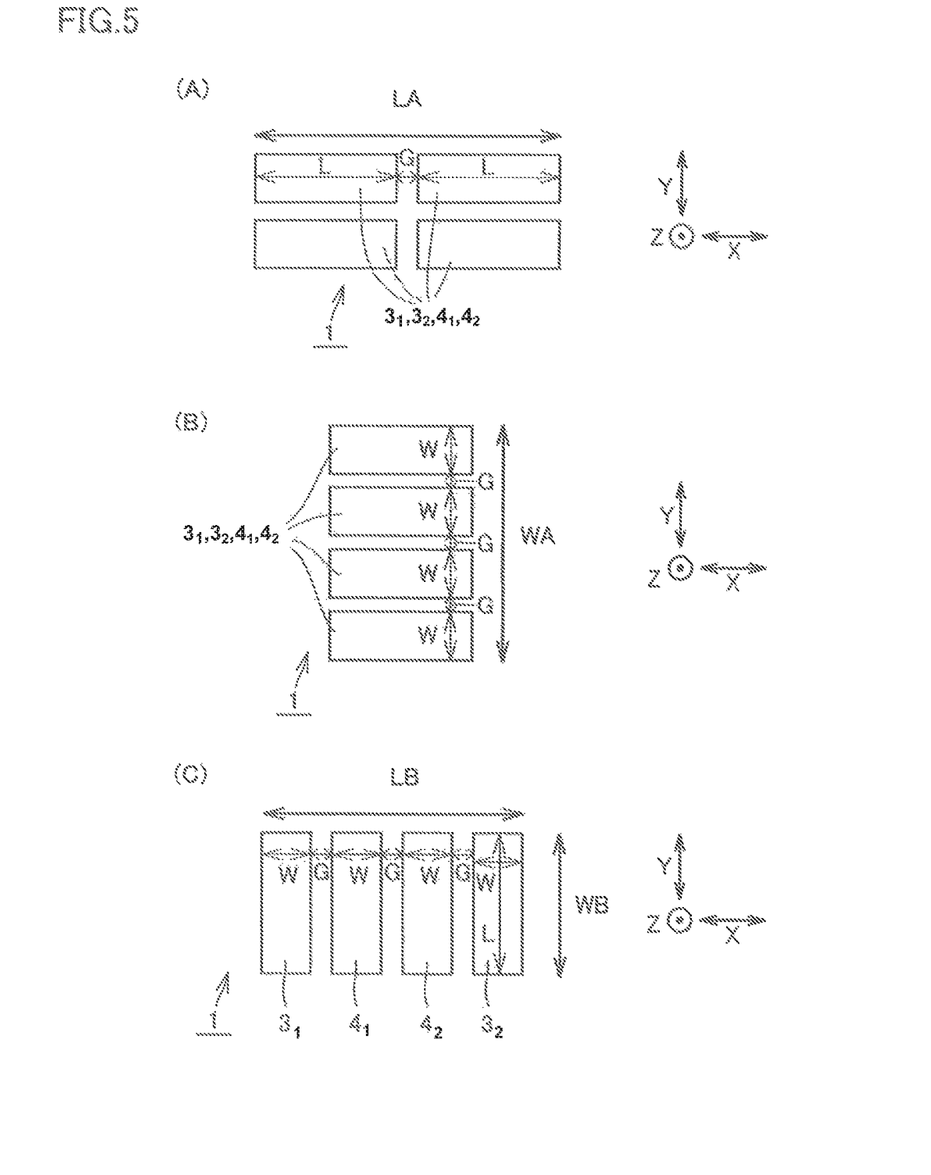

FIG. 5 is a plan view schematically showing a relationship between arrangement of the exhaust gas treatment devices and the dimensions. FIG. 5 (A) shows a configuration (A) of a first comparative example where the exhaust gas treatment devices are arranged in two rows and two columns. FIG. 5 (B) shows a configuration (B) of a second comparative example where four exhaust gas treatment devices are arranged next to each other along the vehicular width direction so that the longitudinal direction of each exhaust gas treatment device is the fore-and-aft direction of the vehicular body. FIG. 5 (C) shows a configuration (C) of the present embodiment where four exhaust gas treatment devices are arranged next to each other along the fore-and-aft direction of the vehicular body so that the longitudinal direction of each exhaust gas treatment device is the vehicular width direction.

The configuration of the present embodiment shown in FIG. 5 (C) enables the dimension in the fore-and-aft direction (X direction) of the vehicular body to be smaller than that of the configuration of the first comparative example shown in FIG. 5 (A), and enables the dimension in the vehicular width direction (Y direction) to be smaller than that of the second comparative example shown in FIG. 5 (B).

Specifically, a dimension LB (=4W+3G) in the fore-and-aft direction of exhaust gas treatment structure 1 in the present embodiment shown in FIG. 5 (C) is smaller than a dimension LA (=2L+G) in the fore-and-aft direction of exhaust gas treatment structure 1 in the first comparative example shown in FIG. 5 (A). Thus, a relation: 4W+3G<2L+G holds.

A dimension WB (=L) in the vehicular width direction of exhaust gas treatment structure 1 in the present embodiment shown in FIG. 5 (C) is smaller than a dimension WA (=4W+3G) in the vehicular width direction of exhaust gas treatment structure 1 in the second comparative example shown in FIG. 5 (B). Thus, a relation: L<4W+3G holds.

Accordingly, first to fourth exhaust gas treatment devices $3_1, 3_2, 4_1, 4_2$ of exhaust gas treatment structure 1 in the present embodiment have dimensions L, W, G satisfying the relation L<4W+3G<2L+G (1).

In view of the fact that dimension G of the gap is smaller than length L and diameter W, the aforementioned relation (1) may be considered with dimension G ignored. In this case, the relation 4W+3G<2L+G may be considered as 2W<L, and the relation L<4W+3G may be considered as L<4W.

Accordingly, in the case where the above-described relations are considered with dimension G of the gap ignored, it is preferable that dimensions L, W, G of first to fourth exhaust gas treatment devices $3_1, 3_2, 4_1, 4_2$ of exhaust gas treatment structure 1 in the present embodiment satisfy 2W<L<4W.

It is noted that diesel particulate filter device (devices $3_1$ and $3_2$) is adapted to collect, by means of a filter, particulate matter such as soot contained in exhaust gas of engine 10. Therefore, in terms of the amount of accumulated particulate matter, the performance of diesel particulate filter device (devices $3_1$ and $3_2$) is basically determined by the volume. Namely, it is necessary for diesel particulate filter device (devices $3_1$ and $3_2$) to have a volume which is enough to obtain required performance.

Diameter W of substantially cylindrical first to fourth exhaust gas treatment devices $3_1, 3_2, 4_1, 4_2$ is effective for the amount of accumulated ash, and length L thereof is effective for the exhaust gas pressure loss. It is noted that an increase of the pressure loss of exhaust gas treatment devices $3_1, 3_2, 4_1, 4_2$ results in greater fuel consumption. In view of this, a smaller pressure loss is desired. In contrast, a greater pressure loss provides exhaust gas treatment devices $3_1, 3_2, 4_1, 4_2$ (particularly diesel particulate filter device (devices $3_1$ and $3_2$)) with higher performance of collecting particulate matter. In view of this, a greater pressure loss is desired.

On the condition that exhaust gas treatment devices $3_1, 3_2, 4_1, 4_2$ are each a linear pipe, the pressure loss of exhaust gas treatment devices $3_1, 3_2, 4_1, 4_2$ is directly proportional to length L and inversely proportional to diameter W. Namely, a greater length L causes a greater pressure loss of exhaust gas treatment devices $3_1, 3_2, 4_1, 4_2$, and a greater diameter W causes a smaller pressure loss thereof.

Treatment of exhaust gas results in foreign matter accumulated within exhaust gas treatment devices $3_1, 3_2, 4_1, 4_2$, and therefore, the pressure loss increases gradually from the exhaust inlet side. In the case where diameter W is made relatively small and length L is made relatively long, the pressure loss of exhaust gas treatment devices $3_1, 3_2, 4_1, 4_2$ is likely to increase from an early stage, which is disadvantageous in terms of fuel economy. In the case where diameter W is made relatively large and length L is made relatively short, the pressure loss of exhaust gas treatment devices $3_1, 3_2, 4_1, 4_2$ is smaller, while a pressure drop is generated due to a dimensional difference between the diameter of the inlet and outlet connection pipes of exhaust gas treatment devices $3_1, 3_2, 4_1, 4_2$ and diameter W of exhaust gas treatment devices $3_1, 3_2, 4_1, 4_2$, resulting in a pressure drop of the exhaust gas treatment system itself.

In view of the above-described pressure loss, pressure drop due to the dimensional difference, and the like, it is preferable that dimensions L, W, G of first to fourth exhaust gas treatment devices $3_1, 3_2, 4_1, 4_2$ of exhaust gas treatment structure 1 are dimensions satisfying the above-referenced relation (L<4W+3G<2L+G). Namely, the arrangement of FIG. 5 (C) in which dimensions L, W, G of first to fourth exhaust gas treatment devices $3_1, 3_2, 4_1, 4_2$ satisfy the aforementioned relation (L<4W+3G<2L+G) can be applied to achieve an arrangement which is compact in both the fore-and-aft direction and the vehicular width direction while the pressure loss, the pressure drop due to the dimensional difference, and the like are appropriately controlled.

Next, a description will be given, using FIG. 4, of a structure supporting exhaust gas treatment structure 1.

Referring to FIG. 4, a support member 46 of exhaust gas treatment structure 1 includes a frame 43, two sub brackets 44, and four small brackets 45.

On frame 43, two sub brackets 44 are each supported. Each of two sub brackets 44 has the shape of a flat plate and is rectangular for example as seen in a plan view. One of two sub brackets 44 is adapted to hold assembly 2a and the other sub bracket 44 is adapted to hold assembly 2b. These two sub brackets 44 are each held in such a manner that the sub bracket is attachable to and detachable from frame 43.

Four small brackets 45 include small bracket 45 supporting diesel particulate filter device $3_1$ of assembly 2a, small bracket 45 supporting selective catalytic reduction device $4_1$ of assembly 2a, small bracket 45 supporting diesel particulate filter device $3_2$ of assembly 2b, and small bracket 45 supporting selective catalytic reduction device $4_2$ of assembly 2b.

Small bracket 45 supporting diesel particulate filter device $3_1$ of assembly 2a and small bracket 45 supporting selective catalytic reduction device $4_1$ of assembly 2a are attached to one of two sub brackets 44. Small bracket 45 supporting diesel particulate filter device $3_2$ of assembly 2b and small bracket 45 supporting selective catalytic reduction device $4_2$ of assembly 2b are attached to the other of two sub brackets 44.

Frame 43 and engine 10 may be supported on the vehicular body frame independently of each other. Accordingly, engine 10 and exhaust gas treatment structure 1 can be installed or removed independently of each other, which facilitates installation and maintenance.

Frame 43 may also be supported on engine 10. Accordingly, exhaust gas treatment structure 1 can be supported on the engine, which makes it possible to compactly arrange exhaust gas treatment structure 1 and engine 10.

Next, a description will be given, using FIG. 3, of a configuration adapted to feed urea to the selective catalytic reduction device of the exhaust gas treatment structure.

Referring to FIG. 3, selective catalytic reduction device (devices $4_1$ and $4_2$) is configured to selectively reduce a nitrogen oxide $NO_x$ by ammonia which is generated through hydrolysis of urea, for example. A device is therefore necessary that feeds urea and water upstream of selective catalytic reduction device (devices $4_1$ and $4_2$). In an atmosphere of high exhaust gas temperature, urea immediately reacts with water to form ammonia, and ammonia is fed together with exhaust gas to selective catalytic reduction device (devices $4_1$ and $4_2$).

This urea feeding device chiefly includes an aqueous urea solution tank (not shown), a pump (not shown), and an aqueous urea solution pipe 23. The aqueous urea solution tank is configured to be able to store the aqueous urea solution. This aqueous urea solution tank is arranged outside the engine compartment, for example, and supported on the vehicular body frame.

Aqueous urea solution pipe 23 connects this aqueous urea solution tank and mixing pipe to each other. By means of this aqueous urea solution pipe 23, the aqueous urea solution stored in the aqueous urea solution tank can be fed into each of two mixing pipes (first and second intermediate connection pipes $5_1$, $5_2$).

The pump is arranged at a certain location along the path of aqueous urea solution pipe 23. This pump performs a function of pumping the aqueous urea solution from the aqueous urea solution tank through aqueous urea solution pipe 23 to each of two mixing pipes (first and second intermediate connection pipes $5_1$, $5_2$).

The pump of the urea feeding device is driven to thereby inject and feed the aqueous urea solution stored in the aqueous urea solution tank through aqueous urea solution pipe 23 into each of two mixing pipes (first and second intermediate connection pipes $5_1$, $5_2$).

Regarding the urea feeding device, aqueous urea solution pipes 23 are connected respectively to two mixing pipes (first and second intermediate connection pipes $5_1$, $5_2$), from the same side (upper side as seen in the drawing) in the longitudinal direction (Y direction). The portion which connects aqueous urea solution pipe 23 to mixing pipe (first and second intermediate connection pipes $5_1$, $5_2$) is located upstream of the exhaust path in mixing pipe (first and second intermediate connection pipes $5_1$, $5_2$). Accordingly, the aqueous urea solution injected and fed into mixing pipe (first and second intermediate connection pipes $5_1$, $5_2$) can be mixed uniformly with exhaust gas while flowing from upstream to downstream in mixing pipe (first and second intermediate connection pipes $5_1$, $5_2$).

Next, the functions and effects of the present embodiment will be described.

In accordance with the present embodiment, as shown in FIG. 3, two diesel particulate filter devices (devices $3_1$ and $3_2$) and two selective catalytic reduction devices (devices $4_1$, $4_2$) have respective longitudinal direction A1, A2, B1, B2 extending along the vehicular width direction (Y direction) of bulldozer 30, as seen in a plan view. Therefore, length LB in the fore-and-aft direction (X direction) of exhaust gas treatment structure 1 in the embodiment shown in FIG. 5 (C) can be made shorter than length LA in the fore-and-aft direction of the arrangement in the first comparative example shown in FIG. 5 (A). Accordingly, blade 32 can be arranged closer to cab 38, which can make the dozing ability excellent and keep the digging force large.

Since length LB in the fore-and-aft direction (X direction) of exhaust gas treatment structure 1 in the embodiment shown in FIG. 5 (C) can be made shorter as described above, the front visibility from an operator is also excellent.

As shown in FIG. 3, exhaust pipe 42 is located on an end side (the upper side as seen in the drawing) in the longitudinal direction (vehicular width direction) of selective catalytic reduction device $4_1$ of assembly 2a and selective catalytic reduction device $4_2$ of assembly 2b, which facilitates arrangement of exhaust pipe 42 away in the vehicular width direction from the line of sight in front of an operator. In this respect too, the front visibility from an operator is also excellent.

As shown in FIG. 3, exhaust pipe 42 is located, as seen in a plan view, in region R2 made up of region R21 where selective catalytic reduction device $4_1$ of assembly 2a is arranged, region R22 where selective catalytic reduction device $4_2$ of assembly 2b is arranged, and region R23 between the second exhaust gas treatment device and the fourth exhaust gas treatment device. Therefore, as shown in FIG. 4, it becomes easier to cause the exhaust gas from selective catalytic reduction device $4_1$ of assembly 2a and the exhaust gas from selective catalytic reduction device $4_2$ of assembly 2b to be merged with each other in collecting pipe 41 and discharged from single exhaust pipe 42 into the atmosphere.

As shown in FIG. 3, each of the region where exhaust pipe connecting part $4_1b$ in assembly 2a is arranged and the region where exhaust pipe connecting part $4_2b$ in assembly 2b is arranged is located separately from each of the region where mixing pipe (first intermediate connection pipe $5_1$) in assembly 2a is arranged and the region where mixing pipe (second intermediate connection pipe $5_2$) in assembly 2b is arranged, with a gap therebetween, as seen in a plan view. Accordingly, exhaust pipe connecting part $4_1b$ in assembly 2a and exhaust pipe connecting part $4_2b$ in assembly 2b can be prevented from overlying, in the height direction, mixing pipe (first intermediate connection pipe $5_1$) in assembly 2a and mixing pipe (second intermediate connection pipe $5_2$) in assembly 2b, and the height of them can be kept low. Accordingly, as shown in FIG. 4, the height of engine hood 39a which covers the upper side of exhaust gas treatment structure 1 can also be kept low, and therefore the front visibility from an operator can be kept excellent.

As shown in FIG. 4, exhaust pipe connecting part $4_1b$ in assembly 2a extends obliquely upward from body portion $4_1a$ and exhaust pipe connecting part $4_2b$ in assembly 2b extends obliquely upward from body portion $4_2a$, so that the leading end (upper end) of exhaust pipe connecting part $4_1b$ in assembly 2a and the leading end (upper end) of exhaust pipe connecting part $4_2b$ in assembly 2b approach each other. Accordingly, to the leading end (upper end) of exhaust pipe connecting part $4_1b$ in assembly 2a and the leading end (upper end) of exhaust pipe connecting part $4_2b$ in assembly 2b which are located close to each other, single common exhaust pipe 42 can easily be connected. Therefore, a configuration can easily be obtained, which is simpler than a configuration where exhaust pipes are individually connected to the leading end of exhaust pipe connecting part $4_1b$ in assembly 2a and the leading end of exhaust pipe connecting part $4_2b$ in assembly 2b, respectively.

In the above-described bulldozer, exhaust pipe connecting part $4_1b$ in assembly 2a and exhaust pipe connecting part $4_2b$ in assembly 2b are arranged next to each other on the same end side (upper side as seen in the drawing) in the longitudinal direction of selective catalytic reduction device $4_1$ of assembly 2a and selective catalytic reduction device $4_2$ of assembly 2b. Accordingly, it is facilitated to connect single common exhaust pipe 42 to exhaust pipe connecting part $4_1b$ in assembly 2a and exhaust pipe connecting part $4_2b$ in assembly 2b that are arranged next to each other on the same end side. Therefore, the configuration can easily be obtained, which is simpler than a configuration where exhaust pipes are individually connected respectively to the leading end of exhaust pipe connecting part $4_1b$ in assembly 2a and the leading end of exhaust pipe connecting part $4_2b$ in assembly 2b.

As shown in FIG. 4, two sub brackets 44 are attached individually (independently) of each other to frame 43 in such a manner that enables the sub brackets to be attached to or detached from frame 43. Accordingly, with assembly 2a attached to frame 43 through sub bracket 44 interposed therebetween, for example, assembly 2b can be removed together with sub bracket 44 from frame 43. Since sub bracket 44 supports both diesel particulate filter device $3_2$ and selective catalytic reduction device $4_2$ of assembly 2b, these devices $3_2$, $4_2$ in the form of one set can simultaneously be removed from frame 43.

On the contrary, with assembly 2b attached to frame 43 through sub bracket 44 interposed therebetween, assembly 2a can be removed together with sub bracket 44 from frame 43.

It should be construed that the embodiments disclosed herein are by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 exhaust gas treatment structure; 2a, 2b assembly; $3_1$ first exhaust gas treatment device; $3_2$ third exhaust gas treatment device; $3_1a$, $3_2a$, $5_1b$, $5_2b$ gas inlet; $4_1$ second exhaust gas treatment device; $4_2$ fourth exhaust gas treatment device; $4_1a$, $4_2a$ body portion; $4_1b$, $4_2b$ exhaust pipe connecting part; $4_1c$, $4_2c$, $5_1a$, $5_2a$ gas outlet; $5_1$, $5_2$ mixing pipe; 7a first connection pipe; 7b second connection pipe; lab, 7bb one end; 8 branch pipe; 9 supercharger; 9a exhaust port; 10 engine; 23 aqueous urea solution pipe; 30 bulldozer; 31 vehicular body; 32 blade; 32U upper end; 33 crawler type carrier; 34 frame; 35 tilt cylinder; 36 lift cylinder; 37 ripper device; 38 cab; 39 engine compartment; 39a engine hood; 41 collecting pipe; 42 exhaust pipe; 43 frame; 44 sub bracket; 45 small bracket; 46 support member

The invention claimed is:

1. A bulldozer comprising:
a cab;
a work implement located frontward of said cab;
an engine arranged between said cab and said work implement;
a first exhaust gas treatment unit including a first exhaust gas treatment device and a second exhaust gas treatment device;
a second exhaust gas treatment unit including a third exhaust gas treatment device and a fourth exhaust gas treatment device; and
an exhaust pipe connected to each of said second exhaust gas treatment device and said fourth exhaust gas treatment device,
said first to fourth exhaust gas treatment devices being arranged next to each other, between said cab and said work implement, in an order of said first exhaust gas treatment device, said second exhaust gas treatment device, said fourth exhaust gas treatment device, and said third exhaust gas treatment device, so that a longitudinal direction of each exhaust gas treatment device is along a vehicular width direction, as seen in a plan view, and
said exhaust pipe being located within a region made up of a region where said second exhaust gas treatment device is arranged, a region where said fourth exhaust gas treatment device is arranged, and a region between said second exhaust gas treatment device and said fourth exhaust gas treatment device, and located on an end side in said longitudinal direction, as seen in a plan view.

2. The bulldozer according to claim 1, wherein
said first exhaust gas treatment unit includes a first intermediate connection pipe connecting said first exhaust gas treatment device and said second exhaust gas treatment device,
said second exhaust gas treatment unit includes a second intermediate connection pipe connecting said third exhaust gas treatment device and said fourth exhaust gas treatment device,
said second exhaust gas treatment device includes a first body portion and a first exhaust pipe connecting part extended from said first body portion and connected to said exhaust pipe,
said fourth exhaust gas treatment device includes a second body portion and a second exhaust pipe connecting part extended from said second body portion and connected to said exhaust pipe, and
each of a region where said first exhaust pipe connecting part is arranged and a region where said second exhaust pipe connecting part is arranged is located separately from each of a region where said first intermediate connection pipe is arranged and a region where said second intermediate connection pipe is arranged, with a gap interposed between the regions, as seen in a plan view.

3. The bulldozer according to claim 2, wherein said first exhaust pipe connecting part extends obliquely upward from said first body portion and said second exhaust pipe connecting part extends obliquely upward from said second body portion, so that a leading end of said first exhaust pipe connecting part and a leading end of said second exhaust pipe connecting part approach each other.

4. The bulldozer according to claim 2, wherein said first exhaust pipe connecting part and said second exhaust pipe connecting part are arranged next to each other on the same end side in said longitudinal direction of said second exhaust gas treatment device and said longitudinal direction of said fourth exhaust gas treatment device.

* * * * *